United States Patent [19]

Dülken et al.

[11] E Patent Number: Re. 32,744

[45] Reissued Date of Patent: Sep. 6, 1988

[54] DUAL LAYER ELECTROPHOTOGRAPHIC RECORDING MATERIAL CONTAINING A LAYER OF SELENIUM, ARSENIC AND HALOGEN, AND THEREABOVE A LAYER OF SELENIUM AND TELLURIUM

[75] Inventors: Hartmut Dülken; Karlheinz Kassel, both of Warstein; Wolfgang Möws, Welver-Borgeln; Hubert Walsdorfer, Warstein, all of Fed. Rep. of Germany

[73] Assignee: Licentia Patent-Verwaltungs- GmbH, Frankfurt am Main, Fed. Rep. of Germany

[21] Appl. No.: 45,017

[22] Filed: Sep. 24, 1986

Related U.S. Patent Documents

Reissue of:

[64] Patent No.: 4,513,072
Issued: Apr. 23, 1985
Appl. No.: 415,466
Filed: Sep. 7, 1982

[30] Foreign Application Priority Data

Sep. 5, 1981 [DE] Fed. Rep. of Germany ..... 3135229

[51] Int. Cl.[4] ..... G03G 5/04

[52] U.S. Cl. ..... 430/95; 430/57; 430/61

[58] Field of Search ..... 430/57, 61, 95, 84; 427/76, 78

[56] References Cited

U.S. PATENT DOCUMENTS

| | | | |
|---|---|---|---|
| 2,803,541 | 8/1957 | Paris | 430/57 |
| 2,803,542 | 7/1955 | Ullrich, Jr. . | |
| 2,822,300 | 2/1958 | Mayer et al. . | |
| 3,639,120 | 2/1972 | Snelling | 430/95 |
| 3,655,377 | 4/1972 | Sechak | 430/57 |
| 3,973,960 | 8/1976 | Dulken et al. | 430/95 |
| 4,296,191 | 10/1981 | Jacobson et al. | 430/57 |

FOREIGN PATENT DOCUMENTS

| | | |
|---|---|---|
| 941767 | 4/1956 | Fed. Rep. of Germany . |
| 1572375 | 2/1970 | Fed. Rep. of Germany . |
| 2305342 | 8/1974 | Fed. Rep. of Germany . |

*Primary Examiner*—John L. Goodrow
*Attorney, Agent, or Firm*—Spencer & Frank

[57] ABSTRACT

[An electrophotographic recording material comprises a conductive substrate, a first photoconductive selenium layer containing halogen disposed on the substrate, and a second photoconductive selenium layer containing arsenic disposed on the second photo conductive layer. The first photo conductive layer disposed on the substrate additionally contains arsenic.] *An electrophotographic recording material comprising a conductive substrate, a first photoconductive selenium layer containing arsenic and halogen disposed on the substrate, and a second photoconductive selenium layer containing tellurium, and optionally containing arsenic, disposed on the first photoconductive layer.*

12 Claims, No Drawings

DUAL LAYER ELECTROPHOTOGRAPHIC RECORDING MATERIAL CONTAINING A LAYER OF SELENIUM, ARSENIC AND HALOGEN, AND THEREABOVE A LAYER OF SELENIUM AND TELLURIUM

Matter enclosed in heavy brackets [ ] appears in the original patent but forms no part of this reissue specification; matter printed in italics indicates the additions made by reissue.

BACKGROUND OF THE INVENTION

The present invention relates to an electrophotographic recording material comprising a conductive substrate, a first photoconductive selenium layer containing halogen disposed on the substrate and a second photoconductive selenium layer containing tellurium disposed on the first photoconductive layer.

Electrophotographic recording materials are used for electrophotographic copying processes which have found wide acceptance in the duplicating art. Such processes are based on the property of the photoconductive material to change its electrical resistance when exposed to an activating radiation.

After a photoconductive layer has been electrically charged and exposed to an activating radiation in a pattern corresponding to an optical image, a latent electrical charge image, which corresponds to the optical image, is produced on the photoconductive layer. At the exposed locations, the conductivity of the photoconductive layer is increased to such an extent that the electrical charge can flow off, at least in part, through the conductive substrate, but in any event the flow off is at a greater extent at the exposed locations than at the unexposed locations. At the unexposed locations, the electrical charge should remain essentially intact, and the pattern of the charge can then be made visible by means of an image powder, a so-called toner. The resulting toner image, if necessary, can then be transferred to paper or some other medium.

Electrophotographically active substances which have been employed include organic as well as inorganic substances. Among the inorganic substances which have been used, selenium, selenium alloys and selenium compounds have gained particular significance. The selenium containing substances play an important role, particularly in their amorphous state, and have found many uses in practice.

The change in electrical conductivity of a photoconductor depends on the intensity and the wavelength of the employed radiation. Within the range of visible light, which is preferred for practical use in electrophotography, for example in office copiers, amorphous selenium exhibits high sensitivity on the blue side, i.e. in the short-wave range, whereas on the red, i.e. in the longwave range, it exhibits a very low sensitivity.

The result is that a red character is reproduced on an electrophotographic plate in the same manner as a black character, which under certain circumstances, particularly with colored masters, may present practical disadvantages, since a black character on a red background—or vice versa—will not be distinguishable from its background and can not, therefore, be made visible. For wavelengths in the infrared range, amorphous selenium is not suitable at all.

In contradistinction to amorphous selenium, crystallized selenium is known to be red sensitive. Thus, the use of crystallized selenium makes possible reproduction involving this part of the visible spectrum. However, the high dark conductivity (dark discharge) of crystallized selenium, i.e. its characteristic of being such a good conductor for electric current while in the unexposed state that a charge applied to its surface cannot be maintained for the length of time required for electrophotographic purposes, discourages its use for such purposes.

Additions to selenium, such as, for example, arsenic or tellurium, are known to broaden the spectral sensitivity of selenium into the longer wave spectral range.

It is also known that by adding halogens to the selenium, an undesirable residual potential which is exhibited by selenium is reduced, which is desirable. On the other hand, too high a halogen content in the selenium again has a disadvantageous influence on its dark discharge.

It may be advisable, under certain circumstances, for the photoconductor of the electrophotographic recording material to be composed of several layers, so that the advantageous characteristics of each individual layer can be utilized simultaneously. Such a recording material is disclosed, for example, in German Pat. No. 941,767 and in DE-OS No. 1,572,375.

In such an arrangement, however, difficulties arise during the manufacturing process with respect to measuring the quantities to be added if one or a plurality of halogens are added to the selenium, for example to the lower layer, in order to reduce the residual potential. Depending on the copying speed, 1 to 3 ppm halogen are already sufficient for this purpose. Higher halogen concentrations lead to the above-mentioned, undesirable high dark discharge which makes the photoconductor unsuitable for purposes of electrophotography. Low halogen concentrations of 1 to 3 ppm halogen, however, can be maintained in practice in a reproduceable manner only with more difficulty. Moreover, the respectively required halogen concentration differs from selenium charge to selenium charge, delivered by producers, so that the required halogen concentration must be set with an accuracy down to 0.1 ppm. Under such conditions, reliable and economical manufacture is hardly possible.

SUMMARY OF THE INVENTION

It is an object of the present invention to provide an electrophotographic recording material having a dual photoconductive layer arrangement of the above-mentioned type, whose spectral sensitivity is set by the amount of tellurium in the upper layer, which has the lowest possible residual potential.

Another object of the present invention is to provide such a dual layer arrangement while eliminating the above-described difficulties connected with measuring out such extremely small halogen quantities and the dependence of the halogen quantities on the nature of the selenium charge.

Additional objects and advantages of the present invention will be set forth in part in the description which follows and in part will be obvious from the description or can be learned by practice of the invention. The objects and advantages are achieved by means of the products, instrumentalities and combinations particularly pointed out in the appended claims.

To achieve the foregoing objects, and in accordance with its purpose, the present invention provides in an electrophotographic recording material comprising a conductive substrate, a first photoconductive selenium layer containing halogen disposed on the substrate and a second photoconductive selenium layer containing tellurium disposed on the first photoconductive layer, the improvement in which the first photoconductive layer disposed on the substrate additionally contains arsenic.

Preferably the first photoconductive layer contains 0.1 to 5, preferably 0.3 to 1 percent by weight arsenic. The proportion of halogen, for example chlorine, in the first photoconductive layer should be 5 to 200 ppm, preferably 10 to 80 ppm.

It has further been found to be of advantage for the second photoconductive layer to contain 1 to 40 percent by weight tellurium and possibly 0 to 1% by weight arsenic, preferably 100 to 1000 ppm. Additionally, the second photoconductive layer preferably can contain 1 to 200 ppm halogen. This second layer can be applied to the first layer according to a known method ether with the aid of full evaporation or by partial evaporation.

It is to be understood that both the foregoing general description and the following detailed description are exemplary, but are not restrictive of the invention.

DETAILED DESCRIPTION OF THE INVENTION

The present invention makes it possible, as a result of the addition of arsenic to the first layer, that the proportion of halogen which can be used can be up to about two orders of magnitude higher than if no arsenic were used. Such halogen quantities are much better and more accurately handled in the process of the present invention than, for example, fractions of a ppm. The precise halogen quantity, which is in a range from 5 to 200 ppm and is no longer critical, does not require the high expenditures that used to be encountered to set the correct halogen concentration. Moreover, there no longer is a significant dependence on the changing characteristics of the respective selenium charge, and reproduceability of the layer characteristics is always obtained.

Further, the reproduceable production of layers having the composition of the present invention is more successful the lower the oxygen content of the selenium employed or of the selenium alloy employed. It is therefore desirable to provide an oxygen content of less than 2 ppm.

The dual layer of the electrophotographic recording material according to the present invention typically has a layer thickness of the first layer of about 55 microns, and a layer thickness of the second layer of about 5 microns. In general, overall thickness ranges, as usual in photoconductor technology, e.g. 15 to 100 microns, are applicable. Such a dual layer has a lower dielectric constant than a homogeneous selenium-tellurium layer. This results in an advantageous higher chargeability with the same layer thickness.

The first layer of the present invention can be produced by relatively simple techniques, which are well known, such as by normal evaporation. The second layer of the present invention, because of its low thickness and the resulting good thermal contact to the crucible of small amount of material to be evaporated, can easily be formed homogeneously and without the danger of disproportioning its components. The tellurium content of the second layer can be set over a relatively broad concentration range of 1 to 40 percent by weight, and this additionally opens up the opportunity of adapting the spectral sensitivity range, as well as the integral sensitivity range of the recording material, to the respective requirements in practice.

Preferably, the electrographic recording material of the present invention contains only the substrate and the first and second layers of the present invention. The first and second photoconductive layers can be prepared as homogeneous layers, and contain amorphous selenium.

The following examples are given by way of illustration to further explain the principles of the invention. These examples are merely illustrative and are not to be understood as limiting the scope and underlying principles of the invention in any way. All percentages referred to herein are by weight unless otherwise indicated.

In the following examples, a preferred electrophotographic recording material according to the present invention is be described once more in greater detail, with the aid of embodiments, and its advantage over recording materials produced according to the prior art is pointed out by way of a comparison with the prior art materials.

EXAMPLE 1 (PRIOR ART)

This example illustrates the production of an electrophotographic recording material according to the prior art.

Approximately 50 g of a selenium alloy containing 2 ppm chlorine are completely evaporated from an evaporation crucible at 290° C. and under a pressure of $<10^{-7}$ bar onto an aluminum drum which has been prepared in the usual manner and whose temperature is approximately 70° C. Then, a second selenium layer containing tellurium is applied onto the vapor-deposited layer. The second layer containing tellurium can be produced, for example, by vapor-depositing 10 g of a selenium alloy containing 15 percent by weight tellurium and 30 ppm chlorine at a temperature of 280° to 320° C., by partially evaporating about 60% of its initial weight, depending on the intended sensitivity of the recording material.

Alternatively, the second selenium layer containing tellurium can be produced by vapor-depositing 5 g of a selenium alloy containing 6 percent by weight tellurium and 25 ppm chlorine at a temperature of 320° C. The given quantity of selenium alloy is vapor-deposited either completely or, if necessary to avoid undue gradients in the surface region, only until a residual portion of 2 to 5% remains in the crucible.

EXAMPLE 2 (PRIOR ART)

This example illustrates the production of an electrophotographic recording material according to the prior art.

The same procedures and conditions that were used in Example 1 were repeated, except that the selenium alloy which is vapor-deposited to form the first layer, contains 4 ppm chlorine instead of 2 ppm chlorine.

It will be found that, in spite of the slight difference in the absolute halogen content in the first partial layer, the layer characteristics of the recording material of Examples 1 and 2 differ substantially, (1) with respect to charge acceptance (800 Volts in example 1, 650 to 700 Volts in example 2), (2) with respect to the amount of the dark discharge, (100 Volts in example 1, 180 Volts in example 2) and (3) with respect to electrophotographic fatigue of charge acceptance (100 Volts in example 1, 200 Volts in example 2). Thus, since a difference of only one or a few ppm in the halogen content has a noticeable effect, the critical limit concentration of halogen depends greatly on more or less inadvertent halogen content of the respectively employed charge. It is therefore almost impossible to obtain a reproduceable product.

EXAMPLE 3 (PRESENT INVENTION)

This example illustrates the production of an electrophotographic recording material according to the present invention.

Approximately 50 g of a selenium alloy containing 0.5% by weight arsenic and 60 ppm chlorine are vapor-deposited from an evaporation crucible at 300° C. and under a pressure of $<10^{-7}$ onto an aluminum drum which has been prepared in the customary manner and whose temperature is about 70° C. If necessary, the last 2% of the starting material are vapor-deposited onto an intermediately disposed shield so as to avoid an unduly high arsenic content in the surface region.

Then, a second selenium layer containing tellurium is vapor-deposited onto the vapor-deposited layer. The second selenium layer containing tellurium can be produced by the same techniques as employed in Example 1.

Thus, the second selenium layer containing tellurium can be produced by vapor-depositing 10 g of a selenium alloy containing 15 percent by weight tellurium and 30 ppm chlorine at a temperature of 280° to 320° C., by partially evaporating about 60% of the starting amount, depending on the intended sensitivity of the recording material.

Alternatively, as in Example 1, the second selenium layer containing tellurium can be produced by vapor-depositing 5 g of a selenium alloy containing 6 percent by weight tellurium and 25 ppm chlorine at a temperature of 320° C. The given quantity of selenium alloy is vapor-deposited either completely or, if required to avoid undue gradients in the surface region, only to a residual amount of 2 to 5% remaining in the crucible.

It has been found that the influence of the amount of halogen in the first layer on the electrophotographic characteristics of the recording material becomes noticeable only very slightly and a variation in the halogen content, which is unavoidable in practice, even if it is within relatively wide limits, is not critical. Thus, it is not difficult to realize reproduceable characteristics in the recording material.

Recording material in example 3 exhibits the following layer characteristics which are shown by electrical data, as given in the examples 1 and 2, charge acceptance 800 Volts, dark discharge 100 Volts, electrophotographic fatique of charge acceptance 100 Volts.

Addition of arsenic in the preferred range (see above description on page 7) to the second layer further reduces dark discharge by 20 to 30 Volts.

It will be understood that the above description of the present invention is susceptible to various modifications, changes, and adaptations, and the same are intended to be comprehended within the meaning and range of equivalents of the appended claims.

What is claimed is:

1. An electrophotographic recording material consisting of a conductive substrate, a first photoconductive selenium layer comprising 0.1 to 5 percent by weight arsenic and a halogen disposed on said substrate, and a second photoconductive selenium layer comprising 1 to 40 weight percent tellurium, and *0 to about 1 weight percent* arsenic [in an amount of up to 1 weight percent] disposed on said first photoconductive layer.

2. Electrophotographic recording material as defined in claim 1, wherein the first photoconductive layer contains 0.5 to 1 percent by weight arsenic.

3. Electrophotographic recording material as defined in claim 1, wherein the first photoconductive layer contains 0.3 to 1 percent by weight arsenic.

4. Electrophotographic recording material as defined in claim 1 or 2, wherein the first photoconductive layer contains 5 to 200 ppm halogen.

5. Electrophotographic recording material as defined in claim 1 or 2, wherein the first photoconductive layer contains chlorine as the halogen.

6. Electrophotographic recording material as defined in claim 1 or 2, wherein the second photoconductive layer contains 100 to 1000 ppm arsenic.

7. Electrophotographic recording material as defined in claim 1 or 2, wherein the second photoconductive layer contains 1 to 200 ppm halogen.

8. Electrophotographic recording material as defined in claim 1 or 2, wherein the selenium contains less than 2 ppm oxygen.

9. Electrophotographic material as defined in claim 1, wherein the first photoconductive selenium layer contains 0.3 to 1 percent by weight arsenic and 10 to 80 ppm halogen, said second photoconductive selenium layer contains 1 to 40 percent by weight tellurium, 100 to 1000 ppm arsenic and 1 to 200 ppm halogen, and the selenium contains less than 2 ppm oxygen.

10. Electrophotographic recording material as defined in claim 1, wherein the layer thickness of the second layer is about 5 microns.

*11. Electrophotographic recording material as defined in claim 1, wherein the second photoconductive layer contains zero percent by weight arsenic.*

*12. Electrophotographic recording material as defined in claim 2, wherein the second photoconductive layer contains zero percent by weight arsenic.*

* * * * *